United States Patent [19]

Iwanami et al.

[11] Patent Number: 5,106,893

[45] Date of Patent: Apr. 21, 1992

[54] FIBER-REINFORCED POLYMER COMPOSITION

[75] Inventors: Kunio Iwanami; Kissho Kitano, both of Ooi; Kiyotada Narukawa, Tokorozawa; Masato Sakuma, Urawa; Takashi Mikami, Komae; Masami Esaki, Toyota; Koji Egashira, Oobu; Hiroyuki Wakabayashi; Fumio Kato, both of Kariya, all of Japan

[73] Assignees: Tonen Sekiyukagak Kabushiki Kaisha, Tokyo; Nippondenso Co., Ltd., Kariya, both of Japan

[21] Appl. No.: 652,401

[22] Filed: Feb. 7, 1991

Related U.S. Application Data

[63] Continuation of Ser. No. 343,633, Apr. 27, 1989, abandoned.

[30] Foreign Application Priority Data

Apr. 28, 1988 [JP] Japan .................... 63-106865
Feb. 15, 1989 [JP] Japan ...................... 1-35357

[51] Int. Cl.$^5$ .................. C08K 5/526; C08K 5/13; C08K 5/36
[52] U.S. Cl. ...................... 524/120; 524/153; 524/285; 524/289; 524/291; 524/304; 524/305
[58] Field of Search .......... 524/120, 153, 285, 289, 524/291, 304, 305

[56] References Cited

U.S. PATENT DOCUMENTS

| | | | |
|---|---|---|---|
| 4,383,064 | 5/1983 | Iida | 524/291 |
| 4,385,143 | 5/1983 | Yachigo et al. | 524/291 |
| 4,404,312 | 9/1983 | Kokubu et al. | 524/505 |
| 4,540,727 | 9/1985 | Vogdes | 524/291 |

Primary Examiner—Kriellion S. Morgan
Attorney, Agent, or Firm—Armstrong, Nikaido, Marmelstein, Kubovcik & Murray

[57] ABSTRACT

A fiber-reinforced polymer composition containing resin components including (a) 30–90 weight % of a polyamide resin, and (b) 10–70 weight % of polyolefin+unsaturated carboxylic acid-modified polyolefin, based on the resin components; and, per 100 parts by weight of the total components, (c) 5–50 parts by weight of glass fibers, and (d) additives including the following set of additives: 0.1–1 parts by weight of N,N'-hexamethylene-bis (3,5-di-tert-butyl-4-hydroxyhydrocinnamide); 0.1–1 parts by weight of triethylene glycol-bis [3-(3-tert-butyl-5-methyl-4-hydroxyphenyl) propionate]; and 0.1–1 parts by weight of pentaerythrityl-tetrakis [3-(3,5-di-tert-butyl-4-hydroxyphenyl) propionate]. An alternative set of additives are 0.1–2 parts by weight of N,N'-bis [3-(3,5-di-tert-butyl-4-hydroxyphenyl) propionyl] hydrazine; 0.05–0.5 parts by weight of pentaerythrityl-tetrakis [3-(3,5-di-tert-butyl-4-hydroxyphenyl) propionate]; 0.05–0.5 parts by weight of distearyl-pentaerythritol diphosphite; and 0.15–1 parts by weight of distearyl-3,3'-thiodipropionate.

4 Claims, 1 Drawing Sheet

F I G. 1
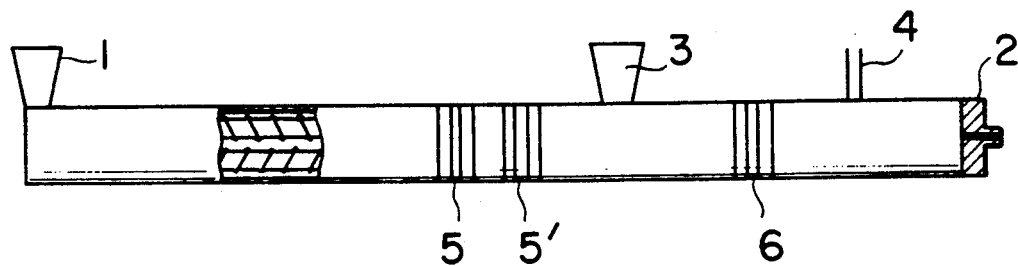
F I G. 2
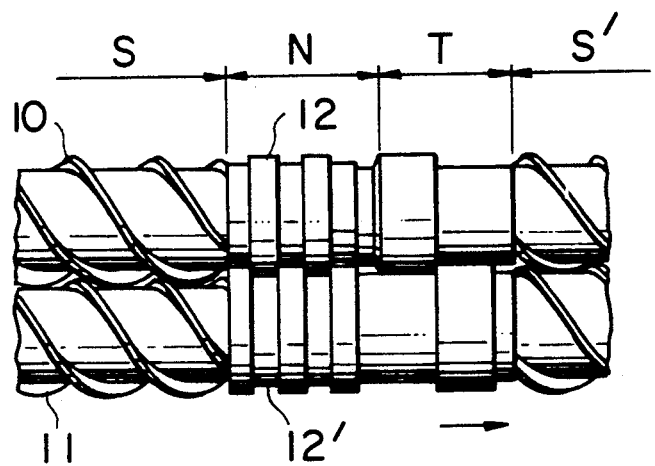
F I G. 3
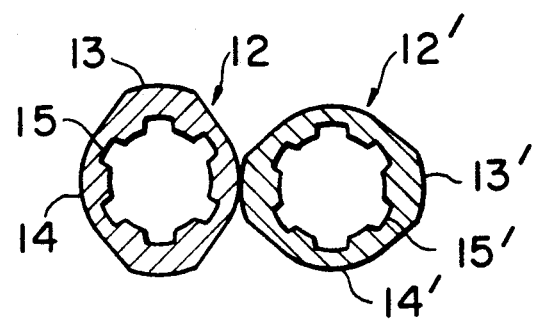

FIBER-REINFORCED POLYMER COMPOSITION

This application is a continuation of application Ser. No. 343,633 filed Apr. 27, 1989 now abandoned.

BACKGROUND OF THE INVENTION

The present invention relates to fiber-reinforced polymer compositions comprising polyamide resins and polyolefins as main components, and more particularly to fiber-reinforced polymer compositions comprising polyamide resins and polyolefins as main components, which are excellent not only in thermal deformation resistance, chemical resistance and impact resistance, but also in antifreeze resistance and moldability, and further have remarkably improved Geer oven life and copper-contacted Geer oven life.

Containers such as radiator tanks of automobiles have been getting increasingly produced from plastics, for the purpose of reducing their weight. As plastic materials for producing such containers, polyamide resins are highly suitable because they are light and excellent in impact resistance, heat resistance, chemical resistance, etc. Particularly, nylon 6 and nylon 66 having excellent strength and heat resistance and blended with glass fibers are widely used.

However, despite the fact that polyamide resins reinforced with glass fibers, etc. are excellent in heat resistance, mechanical strength and long-term durability, they are generally poor in water resistance, moldability, chemical resistance and antifreeze resistance. Particularly, the antifreeze resistance is an important characteristic when they are used for radiator tanks of automobiles, because they are exposed to an antifreeze for a long period of time.

The above desired properties, which are insufficient in the polyamide resins, are generally owned by polyolefins. Thus, various compositions based on polyamide resins, polyolefins and glass fibers have been proposed.

Japanese Patent Publication No. 61-26939 discloses radiator tanks made of compositions comprising (a) polyamide resins, (b) modified polymers obtained by grafting ethylenically unsaturated carboxylic acids or their anhydrides to polypropylene resins, and (c) fibrous reinforcing materials, a weight ratio of the component (a) to the component (b) being 70:30–95:5, and the component (c) being 40–200 parts by weight per 100 parts by weight of the total amount of the component (a) and the component (b).

Japanese Patent Laid-Open No. 61-76540 discloses molded plastic articles for automobiles having one surface exposed to the atmosphere and the other surface exposed to water and being repeatedly subjected to high temperature, the molded articles being made of (A) 90–10 parts by weight of olefin polymers, (B) 10–90 parts by weight of polyamides, and (C) 0.1–20 parts by weight, per 100 parts by weight of (A)+(B), of modified olefin polymers grafted with 0.05–10 parts by weight of monomers selected from unsaturated carboxylic acids or their derivatives.

Japanese Patent Laid-Open No. 62-241940 discloses plastic compositions for radiator tanks for automobiles comprising (A) 30–95 weight % of olefin polymers, (B) 5–70 weight % of polyamides, and (C) 5–200 parts by weight, per 100 parts by weight of (A)+(B), of glass fibers impregnated with acrylic resins as tying agents.

However, despite the fact that in the conventional compositions, the compatibility of polyamide resins and polyolefins and the adhesion of glass fibers to the matrix resins are improved to some extent, they are still insufficient for severe conditions required for radiator tanks, etc.

Further, the conventional polyamide resin/polyolefin compositions are extremely vulnerable to deterioration when being in contact with copper at a high temperature for a long period of time.

OBJECT AND SUMMARY OF THE INVENTION

An object of the present invention is, therefore, to provide fiber-reinforced polymer compositions having excellent water resistance, moldability and antifreeze resistance owned by polyolefins while retaining excellent properties such as thermal deformation resistance of the polyamide resins, and further provided with remarkably improved thermal deterioration resistance under the conditions of contact with such metals as copper (expressed by copper-contacted Geer oven life).

As a result of intense research in view of the above objects, the inventors have found that not only by adding proper amounts of unsaturated carboxylic acid-modified polyolefins to compositions of polyamide resins, polyolefins and glass fibers, but also by adding particular antioxidants and if necessary, particular agents for preventing copper-caused deterioration thereto, the resulting fiber-reinforced polymer compositions can be provided with remarkably improved compatibility between the polyamide resins and the polyolefins, thereby showing excellent properties of both components, and also provided with remarkably improved Geer oven life and copper-contacted Geer oven life. The present invention is based on this finding.

Thus, the fiber-reinforced polymer composition according to one embodiment of the present invention comprises resin components comprising (a) 30–90 weight % of a polyamide resin, and (b) 10–70 weight % of polyolefin+unsaturated carboxylic acid-modified polyolefin, based on the resin components; and, per 100 parts by weight of the entire composition, (c) 5–50 parts by weight of glass fibers, and (d) additives comprising the following compounds:

(1) 0.1–1 parts by weight of N,N'-hexamethylene-bis (3,5-di-tert-butyl-4-hydroxy-hydrocinnamide);

(2) 0.1–1 parts by weight of triethylene glycol-bis [3-(3-tert-butyl-5-methyl-4-hydroxyphenyl) propionate]; and (3) 0.1–1 parts by weight of pentaerythrityl-tetrakis [3-(3,5-di-tert-butyl-4-hydroxyphenyl) propionate].

In order to further improve the Geer oven life of the above fiber-reinforced polymer compositions, (4) up to 1 part by weight of tris (2,4-di-tert-butylphenyl) phosphite may be added.

The fiber-reinforced polymer composition according to another embodiment of the present invention comprises resin components comprising (a) 30–90 weight % of a polyamide resin, and (b) 10–70 weight % of polyolefin+unsaturated carboxylic acid-modified polyolefin, based on the resin components; and, per 100 parts by weight of the entire composition, (c) 5–50 parts by weight of glass fibers, and (d) additives comprising the following compounds:

(5) 0.1–2 parts by weight of N,N'-bis [3-(3,5-di-tert-butyl-4-hydroxyphenyl) propionyl]hydrazine;

(6) 0.05–0.5 parts by weight of pentaerythrityl-tetrakis [3-(3,5-di-tert-butyl-4-hydroxyphenyl) propionate];

(7) 0.05–0.5 parts by weight of distearyl-pentaery-thritol diphosphite; and (8) 0.15–1 parts by weight of distearyl-3,3'-thiodipropionate.

In order to further improve the Geer oven life of the above fiber-reinforced polymer compositions under the conditions of contact with copper and other metals, (9) up to 2 parts by weight of N,N'-hexamethylene-bis (3,5-di-tert-butyl-4-hydroxy-hydrocinnamide) may be added.

BRIEF DESCRIPTION OF THE DRAWINGS

FIG. 1 is a partially cross-sectional schematic side view showing one example of a double-screw extruder for producing the fiber-reinforced polymer composition according to the present invention;

FIG. 2 is a partial enlarged view showing a kneading zone of the double-screw extruder used in the present invention; and FIG. 3 is a cross-sectional view showing one example of a pair of kneading discs.

DETAILED DESCRIPTION OF THE INVENTION

The polyamide resins which may be used in the present invention include polyamide resins formed from aliphatic, alicyclic or aromatic diamines such as hexamethylenediamine, decamethylenediamine, dodecamethylenediamine, 2,2,4- or 2,4,4-trimethylhexamethylenediamine, 1,3- or 1,4-bis (aminomethyl) cyclohexane, bis (p-aminocyclohexylmethane), m- or p-xylylenediamine, etc., and aliphatic, alicyclic or aromatic dicarboxylic acids such as adipic acid, suberic acid, sebacic acid, cyclohexane carboxylic acid, terephthalic acid, isophthalic acid, etc.; polyamide resins formed from amino carboxylic acids such as 6-amino caproic acid, 11-amino undecanoic acid, 12-amino dodecanoic acid, etc.: polyamide resins formed from lactams such as ε-caprolactam, ω-dodecalactam, etc.; polyamide copolymers made of these components; and mixtures of these polyamide resins. Specifically, the polyamide resins may be nylon 6, nylon 66, nylon 610, nylon 9, nylon 6/66, nylon 66/610, nylon 6/11, etc. Among them, nylon 6 and nylon 66 are particularly preferable from the aspect of good rigidity and heat resistance.

The molecular weights of the polyamide resins are not particularly restricted, but it is preferable to use the polyamide resins with relative viscosities $\eta_r$ (measured in 98% sulfuric acid, JIS K6810) of 1.0 or more. Particularly those having relative viscosities of 2.0 or more are preferable because of their excellent mechanical strength.

The polyolefins which may be used in the present invention include homopolymers of α-olefins such as ethylene, propylene, butene-1, pentene-1, hexene-1, 4-methylpentene-1, etc.; copolymers of ethylene and propylene or other α-olefins; and copolymers of α-olefins. Among them, various types of polyethylene such as low-density polyethylene, linear low-density polyethylene, medium-density polyethylene and high-density polyethylene, and polypropylene are preferable. When polypropylene is used, it is not restricted to a homopolymer of propylene, and any random or block copolymers of propylene and other α-olefins, in which the propylene content is 50 mol % or more and preferably 80 mol % or more, may be used. The comonomers copolymerizable with propylene are ethylene and other α-olefins, and ethylene is particularly preferable. Accordingly, the term "polypropylene" used herein means that it is not restricted to a homopolymer of propylene but it includes any types of propylene copolymers.

The modified polyolefins which may be used in the present invention mean polyolefins modified with unsaturated carboxylic acids or their anhydrides. The unsaturated carboxylic acids or their anhydrides include monocarboxylic acids such as acrylic acid, methacrylic acid, etc.; dicarboxylic acids such as maleic acid, endomethylenetetra-hydrophthalic acid, fumaric acid, itaconic acid, etc.; dicarboxylic anhydrides such as maleic anhydride, endomethylenetetrahydrophthalic anhydride, itaconic anhydride, etc., and particularly dicarboxylic acids or their anhydrides are preferable.

The polyolefins to be modified with unsaturated carboxylic acids or their derivatives are, like the above-described polyolefins, not limited to homopolymers of α-olefins but include copolymers of different α-olefins.

The content of unsaturated carboxyl acids or their anhydrides in the modified polyolefins is preferably determined such that a molar ratio of amino groups/carboxylic groups is within the range of 10–1000. Specifically, it is preferably 0.01–15 weight %. When the content of the unsaturated carboxylic acids or their anhydrides grafted is less than 0.01 weight %, the addition of the modified polyolefins does not provide sufficient effect of improving the compatibility of the polyamide resins with polyolefins. On the other hand, when it exceeds 15 weight %, the modified polyolefins show poor compatibility with polyolefins.

The modified polyolefins may be produced by a solution method or a melt-blending method. In the case of a melt-blending method, polyolefins, unsaturated carboxylic acids or their anhydrides for modifying the polyolefins and catalysts are charged into an extruder, a double-screw blender, etc. and blended in a molten state at a temperature of 150°–250° C. Alternatively, in the case of a solution method, the above starting materials are dissolved in organic solvents such as xylene, and a reaction is conducted while stirring at a temperature of 80°–140° C. In any case, the catalysts may be usual radical polymerization catalysts. Specific examples of the catalysts include peroxides such as benzoyl peroxide, lauroyl peroxide, di-tert-butyl peroxide, acetyl peroxide, tert-butyl perbenzoate, dicumyl peroxide, perbenzoic acid, peracetic acid, tert-butyl perpivalate, 2,5-dimethyl-2,5-di-tert-butyl peroxyhexyne, etc.; azo compounds such as azobisisobutyronitrile, etc. The amount of catalysts added is 1–100 parts by weight or so per 100 parts by weight of the unsaturated carboxylic acids or their anhydrides.

In the fiber-reinforced polymer compositions of the present invention, the polyamide resin is 30–90 weight %, and the polyolefin+the modified polyolefin is 10–70 weight %, based on the resin components. When the polyamide resin is less than 30 weight %, the resulting compositions do not show sufficient heat resistance and mechanical strength, and when it exceeds 90 weight %, the resulting compositions do not show sufficient moldability and antifreeze resistance, and their production costs become high. The preferred amount of the polyamide resin is 50–70 weight %, and the preferred amount of the polyolefin+the modified polyolefin is 30–50 weight %.

The amount of the modified polyolefin, particularly the content of the carboxyl groups in the modified polyolefin, preferably has a close relation with the content of end amino groups in the polyamide resin. It is presumed that in the process of melt-blending, the carboxyl groups in the modified polyolefins are reacted with the end amino groups of the polyamide resins to form modified polyolefin-polyamide resin graft copolymers which serve as compatibilizing agents for the polyolefins and the polyamide resins, and that the amount of the graft copolymers formed is closely related with a molar ratio of end amino groups of the polyamide resins/carboxyl groups. Accordingly, it is preferable to adjust the amount of the modified polyolefins in the compositions such that the molar ratio of end amino groups to the carboxyl groups of the modified polyolefins is within the range of 10-1000. When the amino group/carboxyl group molar ratio is less than 10, too much compatibility is obtain, thereby reducing the heat resistance of the resulting compositions because the properties of the polyamide resins and the polyolefins are averaged. On the other hand, when the amino group/carboxyl group molar ratio exceeds 1000, sufficient compatibilizing effect cannot be obtained by the addition of the modified polyolefins, resulting in the compositions with poor mechanical strength. More preferred molar ratio is 20-200. Incidentally, to meet the above requirements of the molar ratio, the amount of the modified polyolefins is generally 0.1-20 weight %, and preferably 0.5-10 weight % based on the resin components.

The amount of the glass fibers is 5-50 parts by weight per 100 parts by weight of the entire composition. When the glass fibers are less than 5 parts by weight, the resulting composition do not have sufficient heat resistance and mechanical strength. On the other hand, when they exceed 50 parts by weight, the resulting compositions show poor moldability and reduced mechanical strength. The preferred amount of glass fibers is 15-40 parts by weight. Incidentally, the glass fibers are preferably in the form of chopped strand, robing, etc. with fiber diameter of 5-15 μm.

In the first embodiment of the present invention, to improve Geer oven life, the fiber-reinforced polymer compositions contain the following compounds;
(1) 0.1-1 parts by weight of N,N'-hexamethylene-bis (3,5-di-tert-butyl-4-hydroxy-hydrocinnamide);
(2) 0.1 parts by weight of triethylene glycol-bis [3-(3-tert-butyl-5-methyl-4-hydroxyphenyl) propionate]; and
(3) 0.1-1 parts by weight of pentaerythrityl-tetrakis [3-(3,5-di-tert-butyl-4-hydroxyphenyl) propionate].

In the first embodiment, all of the above compounds (1)-(3) are indispensable components. When the contents of the compounds (1)-(3) are smaller than the above-described lower limits, sufficient effects of improving the Geer oven life of the fiber-reinforced polymer compositions cannot be achieved. On the other hand, when the contents of the compounds (1)-(3) exceed the above-described upper limits, the Geer oven life rather decreases. The preferred contents of the compounds (1)-(3) are as follows:
(1) 0.2-0.5 parts by weight:
(2) 0.2-0.5 parts by weight; and
(3) 0.2-0.5 parts by weight.

The fiber-reinforced polymer compositions of the first embodiment of the present invention may further contain (4) up to 1 part by weight of tris (2,4-di-tert-butylphenyl) phosphite. When tris (2,4-di-tert-butylphenyl) phosphite is contained, the total amount of the compounds (1)-(4) should be 0.3-3 parts by weight. When it is less than 0.3 parts by weight, sufficient effects of improving the Geer oven life cannot be achieved, and when it exceeds 3 parts by weight, the Geer oven life rather decreases. The preferred total amount of the compounds (1)-(4) is 0.5-2 parts by weight.

In the second embodiment of the present invention, to improve Geer oven life and copper-contacted Geer oven life, the fiber-reinforced polymer compositions of the present invention contain the following compounds:
(5) 0.1-2 parts by weight of N,N'-bis [3-(3,5-di-tert-butyl-4-hydroxyphenyl) propionyl]hydrazine;
(6) 0.05-0.5 parts by weight of pentaerythrityl-tetrakis [3-(3,5-di-tert-butyl-4-hydroxyphenyl) propionate];
(7) 0.05-0.5 parts by weight of distearylpentaerythritol diphosphite: and
(8) 0.15-1 parts by weight of distearyl-3,3'-thiodipropionate.

In the second embodiment, all of the above compounds (5)-(8) are indispensable components. When the contents of the compounds (5)-(8) are smaller than the above-described lower limits, sufficient effects of improving the Geer oven life and copper-contacted Geer oven life of the fiber-reinforced polymer compositions cannot be achieved. On the other hand, when the contents of the compounds (5)-(8) exceed the above-described upper limits, the Geer oven life and the copper-contacted Geer oven life rather decrease. The preferred contents of the compounds (5)-(8) are as follows:
(5) 0.3-1 parts by weight;
(6) 0.1-0.2 parts by weight;
(7) 0.1-0.2 parts by weight; and
(8) 0.2-0.6 parts by weight.

The fiber-reinforced polymer compositions of the second embodiment of the present invention may further contain (9) up to 2 parts by weight of N,N'-hexamethylene-bis (3,5-di-tert-butyl-4-hydroxy-hydrocinnamide), an agent for improving resistance to the thermal deterioration of the polyamide resins, in order to improve the heat resistance of the fiber-reinforced polymer compositions, The preferred amount of N,N'-hexamethylene-bis (3,5-di-tert-butyl-4-hydroxy-hydrocinnamide) added is 0.2-1 parts by weight.

The fiber-reinforced polymer compositions of the present invention have a morphology in which the polyamide resin forms a continuous matrix phase, while the polyolefin forms a domain phase having an average size of 0.5-5 μm. When the fiber-reinforced polymer compositions have such a morphology, they show drastically improved mechanical strength such as tensile strength, flexural modulus, impact strength, etc.

The fiber-reinforced polymer compositions of the resent invention may further contain other additives such as inorganic fillers, thermostabilizers, anti-oxidants, photostabilizers, flame retarders, plasticizers, anti-static agents, parting agents, foaming agents, nucleating agents, etc. to improve their properties.

The compositions of the present invention may be produced by blending in a molten state by using a single-screw extruder, a double-screw extruder, etc.

In the production of the fiber-reinforced polymer compositions of the present invention, the double-screw extruder satisfying the following requirements is preferably used:
(a) Having a first hopper, a second hopper, a vent and a die exit in this order;
(b) Having at least one first kneading zone located upstream of the second hopper for strongly blending the resin components; and (c) Having at least one second kneading zone located between the second hopper and the vent for strongly blending the resin components and the glass fibers.

With respect to the requirement (a), the first hopper is for charging the polyamide resin, the polyolefin and the modified polyolefin into the double-screw extruder, the second hopper is for charging the glass fibers, the vent is for removing low-molecular components generated during the blending of the resin components and the glass fibers, and the die exit is for extruding the blended compositions in the form of strand.

With respect to the requirement (b), the first kneading zone is for strongly kneading the resin components, and, if necessary, a plurality of the first kneading zones are provided. Each first kneading zone s constituted by 4 or more, particularly 4–16 kneading discs arranged continuously. Each pair of the kneading discs are fixed to two screw shafts, so that they are rotated by the rotation of the screws. Since each kneading disc is in a cam shape, a gap between each pair of the kneading discs is changed by the rotation of the screws. Thus, the resin components passing therethrough are strongly blended.

With respect to the requirement (c), the second kneading zone is for strongly blending the resin components and the glass fibers, and its structure itself is essentially the same as the first kneading zone.

The double-screw extruder having the above structural features has a structure as illustrated in FIG. 1. This double-screw extruder preferably has the following structure:

(a) A length/diameter (L/D) ratio of the double-screw extruder is 25 or more;
(b) It has:
  (1) A first hopper 1 for charging the resin components;
  (2) Die 2 for extruding the fiber-reinforced polymer compositions;
  (3) A second hopper 3 positioned in L/D 15–20 downstream of the first hopper for introducing the glass fibers;
  (4) A vent 4 provided between the second hopper 3 and the die 2;
  (5) At least one first kneading zone 5, 5′, . . . (two zones in FIG. 1) provided between the first hopper 1 and the second hopper 3; and
  (6) At least one second kneading zone 6 provided between the second hopper 3 and the vent 4;
(c) The resin temperature in L/D 3.5–7.5 upstream of the second hopper 3 is 290°–320° C.;
(d) The resin temperature in other zones is 260°–290° C.; and
(e) The resin temperature at the die exit is 260°–290° C.

When the L/D ratio of the double-screw extruder is less than 25, sufficient blending cannot be achieved. The preferred L/D ratio is 25–35.

The first hopper (the main hopper) 1, the second hopper 3, the vent 4 and the die 2 may have known structures.

The distance between the second hopper 3 and the die 2 is L/D 5–20. When it is less than L/D 5, sufficient cannot be achieved between the resin components and the glass fibers. On the other hand, when it exceeds L/D 20, the deterioration of the resin components and the breakage of the glass fibers are likely to take place.

In this connection, the distance between the first hopper 1 and the second hopper 3 is preferably L/D 15–20.

The distance between the second hopper 3 and the vent 4 is preferably L/D 3–10. When it is less than L/D 3, sufficient venting effects cannot be obtained because the tying agents of the glass fibers are still in an unmolten state. On the other hand, when it exceeds 10, venting up may take place.

Both of the first kneading zones 5, 5′ and the second kneading zone 6 are preferably L/D 1–4 and constituted by 4 or more kneading discs each having L/D of $\frac{1}{4}$–$\frac{1}{2}$ or so. Incidentally, each kneading zone has preferably the structure as illustrated in FIG. 2.

Specifically speaking, a plurality of the kneading discs 12, 12′. . . arranged on the intermediate portions of the two screws 10, 11 form a kneading zone N, which is sandwiched by screw zones S, S′. In the kneading zone Z, kneading discs 12, 12′. . . are arranged in pair, each fixed to each screw shaft. FIG. 3 shows a cross section of a pair of kneading discs 12, 12′. Each kneading disc 12, 12′ has a peripheral surface in the form of a cam, each having projecting portions 13, 13′ and circular portions 14, 14′. In each pair, the kneading discs 12, 12′ are fixed to the screw shafts (not shown) by spline grooves 15, 15′, such that each of the projecting portions 13, 13′ and each of the circular portions 14, 14′ are opposing to each other. Accordingly, in each pair, a gap between the kneading discs 12, 12′ drastically changes by the rotation of the screw shafts. As shown in FIG. 2, since a plurality of the kneading discs 12, 12′. . . are arranged continuously, the resin components passing through each pair of the kneading discs (or mixtures of the resin components and the glass fibers) are subjected to much stronger blending action than by the screws. Incidentally, in FIG. 2, a transition zone (seal ring) T is provided downstream of the kneading discs 12, 12′ in the kneading zone N, so that the blended product does not easily go out of the kneading zone.

In the above-described structure, it is necessary that there are at least one, preferably two or more, first kneading zone and at least one second kneading zone.

Without the first kneading zone 5, 5′. . . , or if it does not have sufficient length, the resin components would not be well blended, so that they are not sufficiently plasticized.

When the second kneading zone 6 has a length smaller than L/D 1 due to the insufficiency of the number of kneading discs, the resins are too cooled by the addition of the glass fibers, so that the mixing of the glass fibers with the resins is hindered, and that surging tends to take place.

In general, a front end of the first kneading zone 5, 5′ is located at L/D 5–20 downstream of the first hopper, 1 and the total length of the first kneading zone is L/D 2–8 or so. A front end of the second kneading zone 6 is located at L/D 2–6 downstream of the second hopper 3, and the total length of the second kneading zone is L/D 1–4 or so.

When the resin temperature in a zone of L/D 3.5–7.5 upstream of the second hopper 3 does not reach the range of 290°–320° C., the glass fibers are prevented from being mixed with the resin components, and surging may take place. However, when the resin temperature is too high, the resins may be deteriorated, failing to provide the desired properties. In the other zones, the resin temperature is 260°–290° C. Incidentally, the resin temperature at the die exit is preferably 260°–290° C.

In the above double-screw extruder, the resin components are introduced into the double-screw extruder through the first hopper (the main hopper) 1, and the glass fibers are introduced into the double-screw extruder through the second hopper 3, and the two screws are rotated at 100–300 rpm to blend the resin components and the glass fibers. The compositions obtained by blending are extruded through the die exit 2 in the form of strand, and they are cut into pellets.

The fiber-reinforced polymer compositions of the present invention produced by the above double-screw extruder may easily be formed into desired shapes by a usual injection-molding method.

As described above in detail, although the polyamide resins and the polyolefins themselves do not have good compatibility, their compatibility is improved by the addition of the unsaturated carboxylic acid-modified polyolefins. The reason therefor seems to be that a reaction between the end amino groups of the polyamide resins and the carboxyl groups of the modified polyolefins takes place to form polyamide-modified polyolefin graft copolymers.

The compounds (1)–(3) serve to drastically increase the Geer oven life of the fiber-reinforced polymer compositions. The reasons therefor are not necessarily clear, but it may be presumed that the compounds (1)–(3) cooperate with each other to prevent the scission of the polymer chains by oxidation.

Next, when the compositions of the polyamide resins and the polyolefins are kept in contact with copper, the deterioration of the polyolefins is generally accelerated. However, the addition of the copper deterioration preventing agent (compound (5)) together with the agents for improving the thermal deterioration resistance of the polyolefins (compounds (6)–(8)) serves to drastically improve the copper resistance (resistance to copper-caused deterioration) and heat resistance of the compositions. Further, by adding (9) N,N'-hexamethylene-bis (3,5-di-tert-butyl-4-hydroxy-hydrocinnamide), for an agent for improving the thermal deterioration resistance of the polyamide resins, the compositions are provided with further improved heat resistance. The reasons therefor are not necessarily clear, but it may be presumed that a combination of the additive (5) with the additives (6)–(8) synergistically provides the effects of preventing the deterioration of polyolefins, and that the thermal deterioration resistance of the compositions is further improved by the addition of N,N'-hexamethylene-bis (3,5-di-tert-butyl-4-hydroxy-hydrocinnamide).

The present invention will be described in further detail by the following Examples.

In each Example and Comparative Example, the properties of the fiber-reinforced polymer compositions were measured as follows:

(1) MFR

Measured at 275° C. under a load of 2160 g according to JIS K7210.

(2) Thermal deformation temperature

A test piece (cantilever) of 110 mm × 4 mm × 12.7 mm was bent under a constant load of 18.6 kg at a constant temperature elevating rate of 2° C./minute, and a temperature at which the test piece was bent by a predetermined amount (0.25 mm) was measured according to JIS K7207.

(3) Tensile strength

Measured at 23° C. and 140° C. respectively, according to JIS K 7113.

(4) Flexural modulus

Measured at 23° C. and 140° C. respectively, according to JIS K 7203.

(5) Izod impact strength

Measured at 23° C. and −40° C. respectively, according to JIS K 7110.

(6) Antifreeze resistance

A test piece was immersed in a 50% aqueous solution of a commercially available long life automobile coolant at 140° C. for 200 hours, and the tensile strength of the test piece in a water-absorbed state was measured. The antifreeze resistance is expressed by a tensile strength retention ratio (%), assuming that the original tensile strength is 100.

(7) Geer oven life

After heating a test piece in a Geer over at 150° C. for 2000 hours, a tensile strength retention ratio was measured.

(8) Copper-contacted Geer oven life

A test piece was sandwiched by copper pieces on both surfaces, and the same test as in (7) was conducted.

Incidentally, in the tests (3)–(5), they were measured both under dry conditions and under water-absorbed conditions. The dry conditions means that an injection-molded test piece was placed in a desiccator and kept at 23° C. for 75 hours, and the water-absorbed conditions mean that the injection-molded test piece was immersed in water at 100° C. for 24 hours.

EXAMPLES 1–5, COMPARATIVE EXAMPLES 1–5

Nylon, polypropylene, modified polypropylene and additives were dry-blended in a high-speed mixer in proportions shown in Table 1, and introduced into a double-screw extruder of 45 mm in inner diameter through its main hopper. Further, chopped strands of glass fibers having an average diameter of 13 μm and an average length of 3 mm were introduced into the double-screw extruder through its second hopper in proportions shown in Table 1 and blended at 280° C. to produce composition pellets.

The compositions pellets were dried in a drying furnace, and then formed into test pieces by injection molding to measure the properties shown in Table 1. The results are shown in Table 1.

TABLE 1

|  | Example No. ||||| Comparative Example No. |||||
|---|---|---|---|---|---|---|---|---|---|---|
|  | 1 | 2 | 3 | 4 | 5 | 1 | 2 | 3 | 4 | 5 |
| COMPOSITION (wt. %)[1] | | | | | | | | | | |
| Nylon 66[2] | 60 | 60 | 60 | 60 | 60 | 60 | 60 | 60 | 60 | 60 |
| Polypropylene[3] | 35 | 35 | 35 | 35 | 35 | 35 | 35 | 35 | 35 | 35 |
| Modified Polypropylene | | | | | | | | | | |
| Type of Acid | MAH[4] | MAH | MAH | MAH | MAH | MAH | MAH | MAH | MAH | MAH |
| Grafted Acid Content | 0.2 | 0.2 | 0.2 | 0.2 | 0.2 | 0.2 | 0.2 | 0.2 | 1.0 | 0.2 |
| Content | 5 | 5 | 5 | 5 | 5 | 5 | 5 | 5 | 5 | 5 |
| Glass Fiber[5] | 35 | 35 | 35 | 35 | 35 | 35 | 35 | 35 | 35 | 35 |

TABLE 1-continued

|  |  | Example No. |  |  |  |  | Comparative Example No. |  |  |  |  |
|---|---|---|---|---|---|---|---|---|---|---|---|
|  |  | 1 | 2 | 3 | 4 | 5 | 1 | 2 | 3 | 4 | 5 |
| Molar Ratio of Amino Group/ Carboxyl Group | | 24 | 24 | 24 | 24 | 24 | 24 | 24 | 24 | 4.8 | 4.8 |
| Additive | A[6] | 0.2 | 0.2 | 0.5 | 0.5 | 0.5 | 0 | 0.2 | 0.2 | 0 | 2.0 |
|  | B[7] | 0.2 | 0.2 | 0.5 | 0.5 | 0.5 | 0.2 | 0 | 0.2 | 0 | 0.2 |
|  | C[8] | 0.2 | 0.2 | 0.2 | 0.5 | 0.5 | 0.2 | 0.2 | 0 | 0 | 0.2 |
|  | D[9] | 0 | 0.2 | 0.2 | — | — | 0.2 | 0.2 | 0.2 | 0 | 0.2 |
|  | Total | 0.6 | 0.8 | 1.4 | 1.5 | 1.5 | 0.6 | 0.6 | 0.6 | 0 | 2.6 |
| PROPERTIES | | | | | | | | | | | |
| MFR (g/10 minutes) | | 14 | 14 | 14 | 14 | 14 | 14 | 14 | 14 | 3 | 3 |
| Thermal Deformation Temp. (°C.) | | 240 | 240 | 240 | 240 | 240 | 240 | 240 | 240 | 160 | 160 |
| Under Dry Conditions | | | | | | | | | | | |
| Tensile Strength (kg/cm²) | (23° C.) | 2300 | 2300 | 2300 | 2300 | 2300 | 2300 | 2300 | 2300 | 2300 | 2300 |
|  | (140° C.) | 1100 | 1100 | 1100 | 1100 | 1100 | 1100 | 1100 | 1100 | 1100 | 1100 |
| Flexural Modulus (kg/cm²) | (23° C.) | 82000 | 82000 | 82000 | 82000 | 82000 | 82000 | 82000 | 82000 | 80000 | 80000 |
|  | (140° C.) | 30000 | 30000 | 30000 | 30000 | 30000 | 30000 | 30000 | 30000 | 20000 | 20000 |
| Izod Impact Strength (kg · cm/cm) | (23° C.) | 16 | 16 | 16 | 16 | 16 | 16 | 16 | 16 | 9 | 9 |
|  | (−40° C.) | 12 | 12 | 12 | 12 | 12 | 12 | 12 | 12 | 8 | 8 |
| Under Water-Absorbed Conditions | | | | | | | | | | | |
| Tensile Strength (kg/cm²) | (23° C.) | 1500 | 1500 | 1500 | 1500 | 1500 | 1500 | 1500 | 1500 | 1200 | 1200 |
| Flexural Modulus (kg/cm²) | (23° C.) | 61000 | 61000 | 61000 | 61000 | 61000 | 61000 | 61000 | 61000 | 59000 | 59000 |
| Izod Impact Strength (kg · cm/cm) | (23° C.) | 18 | 18 | 18 | 18 | 18 | 18 | 18 | 18 | 11 | 11 |
| Antifreeze Resistance (%) | | 85 | 85 | 85 | 85 | 85 | 85 | 85 | 85 | 80 | 80 |
| Geer Oven Life (%) | | 95 | 95 | 100 | 98 | 99 | 70 | 70 | 70 | 45 | 80 |

Note:
[1] The contents of nylon, polypropylene and modified polypropylene are expressed by weight % based upon resin components, and the contents of glass fibers and additives are expressed by weight % based upon the total composition.
[2] Amiran CM 3001N manufactured by Toray Industries, Inc. and containing end amino groups in an amount of 0.034 milli-equivalent/g measured according to a Korshak-Zamyationa method (back titration method) (Chem. Abs. 40, 4665, '46, ibid 42, 6152, '48).
[3] J-215 manufactured by Tonen Sekiyu Kagaku K.K.
[4] Maleic anhydride.
[5] MA03FT-2 manufactured by Asahi Fiber Glass K.K.
[6] N,N'-hexamethylene-bis (3,5-di-tert-butyl-4-hydroxy-hydrocinnamide) (Irganox 1098 manufactured by Ciba-Geigy).
[7] Triethylene glycol-bis [3-(3-tert-butyl-5-methyl-4-hydroxyphenyl) propionate] (Irganox 245 manufactured by Ciba-Geigy).
[8] Pentaerythrityl-tetrakis [3-(3,5-di-tert-butyl-4-hydroxyphenyl) propionate] (Irganox 1010 manufactured by Ciba-Geigy).
[9] Tris (2,4-di-tert-butylphenyl) phosphite (Irgafos 168 manufactured by Ciba-Geigy.)

EXAMPLES 6 and 7

Fiber-reinforced polymer compositions were produced under the same conditions as in Example 2 and 3 except for changing polypropylene to high-density polyethylene (J-6311, manufactured by Tonen Sekiyu Kagaku K.K.) and using as modified polyethylene the above high-density polyethylene modified with carboxylic acid shown in Table 4. The same tests as in Examples 2 and 3 were conducted. The results are shown in Table 2.

TABLE 2

| Example No. | | 6 | 7 |
|---|---|---|---|
| COMPOSITION (wt. %)[1] | | | |
| Nylon 66[2] | | 60 | 60 |
| Polyethylene[3] | | 35 | 35 |
| Modified Polyethylene | | | |
| Type of Acid | | MAH[4] | MAH |
| Grafted Acid Content | | 0.2 | 0.2 |
| Content | | 5 | 5 |
| Glass Fiber[5] | | 35 | 35 |
| Molar Ratio of Amino Group/ Carboxyl Group | | 24 | 24 |
| Additive | A[6] | 0.2 | 0.5 |
|  | B[7] | 0.2 | 0.5 |
|  | C[8] | 0.2 | 0.2 |
|  | D[9] | 0.2 | 0.2 |
|  | Total | 0.8 | 1.4 |
| PROPERTIES | | | |
| MFR (g/10 minutes) | | 16 | 16 |
| Thermal Deformation Temp. (°C.) | | 240 | 240 |
| Under Dry Conditions | | | |
| Tensile Strength (kg/cm²) | (23° C.) | 1900 | 1900 |
|  | (140° C.) | 900 | 900 |
| Flexural Modulus (kg/cm²) | (23° C.) | 70000 | 70000 |
|  | (140° C.) | 25000 | 25000 |
| Izod Impact Strength (kg · cm/cm) | (23° C.) | 20 | 20 |
|  | (−40° C.) | 17 | 17 |
| Under Water-Absorbed Conditions | | | |
| Tensile Strength (kg/cm²) | (23° C.) | 1500 | 1500 |
| Flexural Modulus (kg/cm²) | (23° C.) | 50000 | 50000 |
| Izod Impact Strength (kg · cm/cm) | (23° C.) | 23 | 23 |
| Antifreeze Resistance (%) | | 87 | 87 |
| Geer Oven Life (%) | | 100 | 100 |

Note: [1], [2], [4]–[9] Same as in Table 1.
[3] High-density polyethylene (J-6311 manufactured by Tonen Sekiyu Kagaku K.K.).

As is clear from the above results, since the fiber-reinforced polymer compositions of the present invention contain not only the unsaturated carboxylic acid-modified polyolefins serving to increase the compatibility of the polyamide resins and the polyolefins but also the above additives, they show not only excellent mechanical strength, heat resistance, moldability, antifreeze resistance, etc., but also remarkably improved Geer oven life.

EXAMPLES 8-10, COMPARATIVE EXAMPLES 6-10

Nylon, polypropylene, modified polypropylene and additives were dry-blended in a high-speed mixer in proportions shown in Table 3, and introduced into a double-screw extruder of 45 mm in inner diameter through its main hopper. Further, chopped strands of glass fibers having an average diameter of 13 μm and an average length of 3 mm were introduced into the double-screw extruder through its second hopper in proportions shown in Table 3 and blended at 280° C. to produce composition pellets.

The composition pellets were dried in a drying furnace, and then formed into test pieces by injection molding to measure the properties shown in Table 3. The results are shown in Table 3.

EXAMPLES 11 and 12

Fiber-reinforced polymer compositions were produced under the same conditions as in Examples 8-10 except for changing polypropylene to high-density polyethylene (J-6311, manufactured by Tonen Sekiyu Kagaku K.K.) and using as modified polyethylene the above high-density polyethylene modified with carboxylic acid shown in Table 4. The same tests as in Examples 8-10 were conducted. The results are shown in Table 4.

TABLE 4

| Example No. | 11 | 12 |
|---|---|---|
| COMPOSITION (wt. %)[1] | | |
| Nylon 66[2] | 60 | 60 |
| Polyethylene[3] | 35 | 35 |
| Modified Polyethylene | | |
| Type of Acid | MAH[4] | MAH |
| Grafted Acid Content | 0.2 | 0.2 |
| Content | 5 | 5 |

TABLE 3

| | | Example No. | | | Comparative Example No. | | | | |
|---|---|---|---|---|---|---|---|---|---|
| | | 8 | 9 | 10 | 6 | 7 | 8 | 9 | 10 |
| COMPOSITION (wt. %)[1] | | | | | | | | | |
| Nylon 66[2] | | 60 | 60 | 60 | 60 | 60 | 60 | 60 | 60 |
| Polypropylene[3] | | 35 | 35 | 35 | 35 | 35 | 35 | 35 | 35 |
| Modified Polypropylene | | | | | | | | | |
| Type of Acid | | MAH[4] | MAH | MAH | MAH | MAH | MAH | MAH | MAH |
| Grafted Acid Content | | 0.2 | 0.2 | 0.2 | 0.2 | 0.2 | 0.2 | 1.0 | 0.2 |
| Content | | 5 | 5 | 5 | 5 | 5 | 5 | 5 | 5 |
| Glass Fiber[5] | | 35 | 35 | 35 | 35 | 35 | 35 | 35 | 35 |
| Molar Ratio of Amino Group/ Carboxyl Group | | 24 | 24 | 24 | 24 | 24 | 24 | 4.8 | 4.8 |
| Additive | E[6] | 0.5 | 1.0 | 1.0 | 0 | 1.0 | 0 | 1.0 | 0 |
| | F[7] | 0.5 | 1.0 | 0 | 0 | 0 | 1.0 | 0 | 1.0 |
| | G[8] | 0.1 | 0.2 | 0.2 | 0 | 0 | 0 | 0.2 | 0.2 |
| | H[9] | 0.1 | 0.2 | 0.2 | 0 | 0 | 0 | 0.2 | 0.2 |
| | I[10] | 0.3 | 0.6 | 0.6 | 0 | 0 | 0 | 0.6 | 0.6 |
| PROPERTIES | | | | | | | | | |
| MFR (g/10 minutes) | | 14 | 14 | 14 | 14 | 14 | 14 | 3 | 3 |
| Thermal Deformation Temp. (°C.) | | 240 | 240 | 240 | 240 | 240 | 240 | 160 | 160 |
| Under Dry Conditions | | | | | | | | | |
| Tensile Strength (kg/cm$^2$) | (23° C.) | 2300 | 2300 | 2300 | 2300 | 2300 | 2300 | 1800 | 1800 |
| | (140° C.) | 1100 | 1100 | 1100 | 1100 | 1100 | 1100 | 500 | 500 |
| Flexural Modulus (kg/cm$^2$) | (23° C.) | 82000 | 82000 | 82000 | 82000 | 82000 | 82000 | 80000 | 80000 |
| | (140° C.) | 30000 | 30000 | 30000 | 30000 | 30000 | 30000 | 20000 | 20000 |
| Izod Impact Strength (kg·cm/cm) | (23° C.) | 16 | 16 | 16 | 16 | 16 | 16 | 9 | 9 |
| | (−40° C.) | 12 | 12 | 12 | 12 | 12 | 12 | 8 | 8 |
| Under Water-Absorbed Conditions | | | | | | | | | |
| Tensile Strength (kg/cm$^2$) | (23° C.) | 1500 | 1500 | 1500 | 1500 | 1500 | 1500 | 1200 | 1200 |
| Flexural Modulus (kg/cm$^2$) | (23° C.) | 61000 | 61000 | 61000 | 61000 | 61000 | 61000 | 59000 | 59000 |
| Izod Impact Strength (kg·cm/cm) | (23° C.) | 18 | 18 | 18 | 18 | 18 | 18 | 11 | 11 |
| Antifreeze Resistance (%) | | 85 | 85 | 85 | 85 | 85 | 85 | 80 | 80 |
| Geer Oven Life (%) | | 95 | 98 | 90 | 70 | 60 | 60 | 80 | 80 |
| Copper-Contacted Geer Oven Life (%) | | 90 | 95 | 88= | 40 | 60 | 50 | 80 | 60 |

Note:
[1]The contents of nylon, polypropylene and modified polypropylene are expressed by weight % based upon resin components, and the contents of glass fibers and additives are expressed by weight % based upon the composition.
[2]Amiran CM 3001N manufactured by Toray Industries, Inc. and containing end amino groups in an amount of 0.034 milli-equivalent/g measured according to a Korshak-Zamyationa method (back titration method) (Chem. Abs. 40, 4665, '46, ibid 42, 6152, '48).
[3]J-215 manufactured by Tonen Sekiyu Kagaku K.K.
[4]Maleic anhydride.
[5]MA03FT-2 manufactured by Asahi Fiber Glass K.K.
[6]N,N'-bis [3-(3,5-di-tert-butyl-4-hydroxyphenyl) propionyl] hydrazine (Irganox MD 1024 manufactured by Ciba-Geigy).
[7]N,N'-hexamethylene-bis (3,5-di-tert-butyl-4-hydroxy-hydrocinnamide) (Irganox 1098 manufactured by Ciba-Geigy).
[8]Pentaerythrityl-tetrakis [3-(3,5-di-tert-butyl-4-hydroxyphenyl) propionate] (Irganox 1010 manufactured by Ciba-Geigy).
[9]Distearyl-pentaerythritol diphosphite (MARK PEP-8 manufactured by Adeka Argus Chemical Co., Ltd.).
[10]Distearyl-3,3'-thiodipropionate (Sumilizer TPS manufactured by Sumitomo Chemical Co., Ltd.).

TABLE 4-continued

| Example No. | | 11 | 12 |
|---|---|---|---|
| Glass Fiber[5] | | 35 | 35 |
| Molar Ratio of Amino Group/Carboxyl Group | | 24 | 24 |
| Additive | E[6] | 0.5 | 1.0 |
| | F[7] | 0.5 | 1.0 |
| | G[8] | 0.1 | 0.2 |
| | H[9] | 0.1 | 0.2 |
| | I[10] | 0.3 | 0.6 |
| PROPERTIES | | | |
| MFR (g/10 minutes) | | 16 | 16 |
| Thermal Deformation Temp. (°C.) | | 240 | 240 |
| Under Dry Conditions | | | |
| Tensile Strength (kg/cm$^2$) | (23° C.) | 1900 | 1900 |
| | (140° C.) | 900 | 900 |
| Flexural Modulus (kg/cm$^2$) | (23° C.) | 70000 | 70000 |
| | (140° C.) | 25000 | 25000 |
| Izod Impact Strength (kg · cm/cm) | (23° C.) | 20 | 20 |
| | (−40° C.) | 17 | 17 |
| Under Water-Absorbed Conditions | | | |
| Tensile Strength (kg/cm$^2$) | (23° C.) | 1500 | 1500 |
| Flexural Modulus (kg/cm$^2$) | (23° C.) | 50000 | 50000 |
| Izod Impact Strength (kg · cm/cm) | (23° C.) | 23 | 23 |
| Antifreeze Resistance | | 87 | 87 |
| Geer Oven Life (%) | | 100 | 100 |
| Copper-Contacted Geer Oven Life (%) | | 90 | 85 |

Note:[1], [2], [4]–[10] Same as in Table 3.
[3]High-density polyethylene (J-6311 manufactured by Tonen Sekiyu Kagaku K.K.).

As is clear from the above results, since the fiber-reinforced polymer compositions of the present invention contain not only the unsaturated carboxylic acid-modified polyolefins serving to increase the compatibility of the polyamide resins and the polyolefins but also the above additives, they show not only excellent mechanical strength, heat resistance, moldability, antifreeze resistance, etc., but also remarkably improved Geer oven life and copper-contacted Geer oven life.

As described above in detail, the fiber-reinforced polymer compositions of the present invention are excellent not only in mechanical strength such as tensile strength and impact strength but also in heat resistance and moldability. Further, they shown remarkably improved Geer oven life (aging resistance) and copper-contacted Geer oven life (resistance to copper). Accordingly, even though commercially available nylon containing copper-including additives are used to prepare polymer compositions, they show good durability under the conditions of contact with copper because they have high resistance to copper-caused deterioration.

In addition, since the fiber-reinforced polymer compositions of the present invention undergo reduced water absorption, their properties are not deteriorated under water-absorbing conditions. Besides, since they contain relatively large amounts of polyolefins, they are advantageous in costs.

The fiber-reinforced polymer compositions of the present invention are highly suitable for containers such as radiator tanks of automobiles, parts disposed near automobile engines, parts of electric appliances. etc.

What is claimed is:

1. A fiber-reinforced polymer composition comprising resin components comprising (a) 30–90 weight % of a polyamide resin, and (b) 10–70 weight % of polyolefin+unsaturated carboxylic acid-modified polyolefin, based on said resin components; and, per 100 parts by weight of the total composition, (c) 5–50 parts by weight of glass fibers, and (d) additives comprising the following compounds:
   (1) 0.1–1 parts by weight of N,N'-hexamethylene-bis (3,5-di-tert-butyl-4-hydroxy-hydrocinnamide);
   (2) 0.1–1 parts by weight of triethylene glycol-bis [3-(3-tert-butyl-5-methyl-4-hydroxyphenyl) propionate]; and
   (3) 0.1–1 parts by weight of pentaerythrityl-tetrakis [3-(3,5-di-tert-butyl-4-hydroxyphenyl) propionate].

2. The fiber-reinforced polymer composition according to claim 1, wherein said additives further comprise (4) up to 1 part by weight of tris (2,4-di-tert-butylphenyl) phosphite.

3. A fiber-reinforced polymer composition comprising resin components comprising (a) 30–90 weight % of a polyamide resin, and (b) 10–70 weight % of polyolefin+unsaturated carboxylic acid-modified polyolefin, based on said resin components; and, per 100 parts by weight of the total composition, (c) 5–50 parts by weight of glass fibers, and (d) additives comprising the following compounds:
   (5) 0.1–2 parts by weight of N,N'-bis [3-(3,5-di-tert-butyl-4-hydroxyphenyl) propionyl]hydrazine;
   (6) 0.05–0.5 parts by weight of pentaerythrityl-tetrakis [3-(3,5-di-tert-butyl-4-hydroxyphenyl) propionate];
   (7) 0.05–0.5 parts by weight of distearyl-pentaerythritol diphosphite; and
   (8) 0.15–1 parts by weight of distearyl-3,3'-thiodipropionate.

4. The fiber-reinforced polymer composition according to claim 3, wherein said additives further comprise (9) up to 2 parts by weight of N,N'-hexamethylene-bis (3,5-di-tert-butyl-4-hydroxy-hydrocinnamide).

* * * * *